United States Patent
Buhler et al.

(10) Patent No.: US 8,586,664 B2
(45) Date of Patent: Nov. 19, 2013

(54) POLYAMIDE MOULDED MASSES CONTAINING SEMI-CRYSTALLINE TRANSPARENT COPOLYAMIDES FOR PRODUCING HIGHLY FLEXIBLE TRANSPARENT MOULDED PARTS WITH HIGH NOTCH-IMPACT STRENGTH, LOW WATER ABSORBENCY AND EXCELLENT RESISTANCE TO CHEMICALS

(75) Inventors: Friedrich Severin Buhler, Thusis (CH); Ralf Hala, Lindenberg (DE); Sepp Bass, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 0 days.

(21) Appl. No.: 13/001,567

(22) PCT Filed: Jun. 18, 2009

(86) PCT No.: PCT/EP2009/057584
§ 371 (c)(1),
(2), (4) Date: Dec. 27, 2010

(87) PCT Pub. No.: WO2009/156323
PCT Pub. Date: Dec. 30, 2009

(65) Prior Publication Data
US 2011/0105697 A1    May 5, 2011

(30) Foreign Application Priority Data
Jun. 26, 2008   (EP) .................... 08011622

(51) Int. Cl.
C08L 77/06   (2006.01)
C08G 69/26   (2006.01)
G02B 6/44    (2006.01)

(52) U.S. Cl.
USPC ........... 524/538; 264/143; 524/514; 524/539; 525/425; 525/432; 528/364

(58) Field of Classification Search
USPC .................. 524/514, 538, 539; 525/425, 432; 528/346; 264/143
See application file for complete search history.

(56) References Cited

U.S. PATENT DOCUMENTS

| | | | |
|---|---|---|---|
| 4,255,560 A | 3/1981 | Meyer et al. | |
| 5,360,891 A | 11/1994 | Wenzel et al. | |
| 5,700,900 A * | 12/1997 | Hewel et al. | 528/335 |

FOREIGN PATENT DOCUMENTS

| | | |
|---|---|---|
| DE | 37 17 928 A1 | 5/1988 |
| DE | 43 10 970 A1 | 10/1994 |
| DE | 196 42 885 A1 | 4/1998 |
| EP | 0 012 931 A2 | 7/1980 |
| WO | 98/40428 A1 | 9/1998 |

* cited by examiner

*Primary Examiner* — Ana Woodward
(74) *Attorney, Agent, or Firm* — Sughrue Mion, PLLC

(57) ABSTRACT

The invention relates to polyamide molding material for the production of transparent or colorable moldings with high flexibility, high notched impact strength (Charpy), low water absorption and excellent chemical resistance, comprising at least one partly crystalline, transparent copolyamide (A) with a glass transition temperature ($T_g$) of at most 80° C. and a melting temperature of at least 150° C., and a heat of fusion of at least 20 J/g, where the glass transition temperature ($T_g$), the melting temperature ($T_m$) and the heat of fusion (HF) are determined according to ISO 11357-1/2, under conditions where the differential scanning calorimetry (DSC) is performed with a heating rate of 20 K/min, wherein the copolyamide (A) includes no aromatic dicarboxylic acids.

24 Claims, No Drawings

POLYAMIDE MOULDED MASSES CONTAINING SEMI-CRYSTALLINE TRANSPARENT COPOLYAMIDES FOR PRODUCING HIGHLY FLEXIBLE TRANSPARENT MOULDED PARTS WITH HIGH NOTCH-IMPACT STRENGTH, LOW WATER ABSORBENCY AND EXCELLENT RESISTANCE TO CHEMICALS

CROSS REFERENCE TO RELATED APPLICATIONS

This application is a National Stage of International Application No. PCT/EP2009/057584 filed Jun. 18, 2009, claiming priority based on European Patent Application No. 08011622.1 filed Jun. 26, 2008, the contents of all of which are incorporated herein by reference in their entirety.

TECHNICAL FIELD

The invention relates to transparent, impact-resistant and flexible polyamide molding materials with low water absorption and excellent chemical resistance, i.e. high resistance to alcohols, based on partly crystalline but simultaneously transparent copolyamides based predominantly on aliphatic monomers. The copolyamides present in the molding material are always formed from at least two different diamines, one cycloaliphatic and one linear and/or branched-chain aliphatic diamine having 9 to 14 carbon atoms, and aliphatic dicarboxylic acids. The size of the crystals, however, is smaller than the wavelength of visible light, and so these partly crystalline copolyamides are transparent. The transparent copolyamides are preferably produced from monomers based on renewable raw materials. The biobased content here is at least 70%.

The abovementioned biobased content to ASTM D6866-06a is the measure of the proportion of non-fossil, i.e. renewable, carbon. The biobased content is derived from the ratio of the carbon isotopes $C_{12}$ and $C_{14}$. Since this ratio differs significantly in fossil and renewable raw materials, the biobased content in the inventive polyamide molding materials can be detected by a simple measurement technique as a property which clearly characterizes the product.

Users which process polyamide molding materials further, for example to moldings, and which desire certification, for example, according to the ISO 14000 group of standards are committed to sustainable development. For example, they draw up life cycle assessments (LCAs) about the $CO_2$ balance of products. A contributory factor is a short time span between release of $CO_2$ (source) and reimmobilization (sink), as is possible by virtue of the inventive use of biologically renewable raw materials with the stated values for the biobased content. The person skilled in the art is thus faced with the problem of having to use ecologically advantageous materials which have to date been associated with disadvantageous material properties. In one embodiment, the invention in this respect constitutes a teaching for the overcoming of this problem, since it thus surprisingly provides an unexpectedly high-quality transparent copolyamide as a material, which is nevertheless ecologically substantially benign because it is formed substantially from renewable raw materials.

The present invention likewise relates to a process for producing the abovementioned polyamide molding materials based on partly crystalline, transparent copolyamides, and to moldings produced from the molding materials, for example products for applications in the field of sports equipment, sports shoes, in the field of items of sports equipment such as ski boots, ski bindings, helmets, or else high-quality moldings such as housing and display material for cellphones, GPS units, MP3 players, spectacles, lenses, cameras, optical instruments and binoculars.

High-quality surfaces are used to promote "high end quality" positioning of automobile equipment, domestic appliances, consumer electronics, sports equipment and easy-clean industrial surfaces. For this purpose, high demands are made on the material which must not only have the high-value appearance but also be resistant to fracture, free-flowing and extensible and have low warpage. This requires low changes in volume as a result of crystallization, and low moisture absorption. In addition, excellent abrasion resistance and dynamic load-bearing capacity are required, which are typical properties of extensible polyamides. Moldings formed from the inventive polyamide molding materials therefore possess excellent transparency, toughness and abrasion resistance. High chemical resistance and high resistance to fatigue under flexural stress permit uses of these moldings in demanding environments.

The inventive molding materials can be processed on known processing systems by known methods to give the high-quality moldings mentioned.

STATE OF THE ART

The starting compounds or monomers for polymers are at present still generally being obtained from fossil sources (mineral oil). However, these resources are restricted, and so substitutes are being sought. There is therefore rising interest in renewable raw materials which can be used for production of "bioplastics" or plastics with a high biobased content. By virtue of the chemical process of cracking and repolymerization, it is nowadays possible to produce molecular chains which can possess comparable properties to those based on mineral oil. Possible starting plants are, for example, plants which produce vegetable oils, for example castor oil, tall oil fatty acids, and oleic acid, linoleic acid or linolenic acid. Erucic acid is obtained, for example, from the seeds of rape, mustard, wallflower or cress.

Owing in particular to the global rise in mineral oil prices and the demand for energy, but also owing to political instability in the producing countries, renewable raw materials are therefore also becoming a real alternative for the plastics sector.

Owing to their positive properties, bioplastics in many sectors are a real alternative to conventional fossil plastics. Polyamides with biobased contents above 50% are therefore conceivable. However, these are partly crystalline polyamides which are not transparent. Nowadays, typical representatives of partly crystalline polyamides, such as nylon-6, nylon-11, nylon-6,6, nylon-6,9, nylon-6,10, etc. are still being produced from mineral oil-based monomers. It is theoretically possible here to achieve a biobased content of virtually 100%.

Irrespective of the raw material basis, however, the transparent polyamide molding materials still have to meet the high customer demands, i.e. in addition to very good optical properties the mechanical properties and the chemical resistance must be at a high level.

Some patent documents describe amorphous, transparent or partly crystalline transparent polyamide molding materials suitable for production of high-quality moldings with excellent surfaces. The establishment of advantageous properties such as toughness, chemical resistance, flexural fatigue resistance, etc. has been described.

Numerous monomers are available for formation of such polyamides or copolyamides. Transparent polyamides or copolyamides for production of transparent moldings can be produced in amorphous or partly crystalline form. The glass transition temperatures are generally set significantly above 80° C. in order to obtain products with sufficient heat distortion resistance. The stiffness, reported as the tensile modulus of elasticity, is more than 1500 MPa. The Charpy notched impact strengths at 23° C. are well below 15 kJ/m².

To modify the properties of these transparent polyamides or copolyamides, blends with other polyamides and/or further additives or reinforcers are therefore frequently produced.

Partly crystalline, transparent polyamide molding materials with excellent chemical resistance, especially to alcohols, which have been produced from PACM (bis(4-aminocyclohexyl)methane) with 35-60 mol % of trans,trans isomers of bis(4-aminocyclohexyl)methane, 65-40 mol % of other diamines and dodecanedioic acid are known from DE 43 10 970. Disadvantages are the glass transition temperature (TO of 140° C., and the moderate stiffness, as a result of which these partly crystalline polyamides, like the customary amorphous transparent polyamides, are rather difficult to process and have the properties thereof. The dynamic load-bearing capacity for these polyamide types is at moderate numbers of cycles for defined initial flexural stresses.

EP 0012931 A2 describes copolyamides which are obtained by polycondensation of aliphatic and/or aromatic dicarboxylic acids and an amine mixture composed of diaminodicyclohexylmethanes, optionally homologous polycyclopolyamines and optionally further aliphatic and cycloaliphatic diamines. According to example 3, the concentration of hexamethylenediamine is 69 mol %, and that of the cycloaliphatic diamine, i.e. of the mixture of PACM positional isomers, 31 mol %, based on the total amount of diamines. The content of 2,4'-diaminodicyclohexylmethane in the amine mixture is 5% by weight. EP 0012931 A2 does not contain any statements about crystallinity, glass transition temperature, melting temperature and enthalpy of fusion of the products produced.

DE 43 10 970 A1 describes polyamide molding materials based on polyamides formed from aliphatic dicarboxylic acids, 35-60 mol % of trans,trans-bis(4-aminocyclohexyl)methane and 65-40 mol % of other aliphatic, cycloaliphatic, araliphatic or aromatic diamines. However, the formulations of DE 43 10 970 contain exclusively cycloaliphatic diamines. The PACM used in each case is only one PACM cis,trans isomer mixture.

WO 98/40428 describes copolyamides which contain at least one cycloaliphatic diamine in addition to an aliphatic diamine, and at least one cycloaliphatic dicarboxylic acid in addition to at least one aliphatic dicarboxylic acid. However, the examples disclose only 1,4-cyclohexyldicarboxylic acid (CHDA) as a cycloaliphatic component of the copolyamides; aliphatic diamines are not used.

In addition, EP-A-0 725 101 discloses amorphous, transparent polyamide molding materials with high chemical and thermal stability and excellent dynamic load-bearing capacity with respect to repeated alternating stress, which are formed from MACM (bis(4-amino-3-methylcyclohexyl)methane) and dodecanedioic acid. Compared to the partly crystalline, transparent polyamides, the resistance to alcohols is much lower. The glass transition temperature is 155° C.; the notched impact strength, especially at temperatures below 0° C., is below 10 kJ/m². The tensile modulus of elasticity, at 1600 MPa, is in the range of moderate stiffness. The dynamic load-bearing capacity for these polyamide types is at high numbers of cycles for defined initial flexural stresses.

Amorphous, transparent polyamide molding materials comprising at least one second homopolyamide, which exhibit not only the properties described in EP-A-0 725 101 but also outstanding dynamic load-bearing capacity and are suitable for production of moldings for optical or electrooptical applications, for example lenses for sunglasses and light waveguides, are described in DE 196 42 885 C2.

The transparent copolyamides described in DE 3 717 928 C2 are characterized in that an isomer mixture containing at least 80% trans,trans and/or cis,trans bis(4-amino-3-methyl-5-ethylcyclohexyl)-methane must always be present in the diamine mixtures. This does not allow high resistance to alcohols to be achieved. The polyamides described are amorphous, have a $T_g$ of well above 100° C., and have tensile moduli of elasticity of 2000 MPa or higher. They additionally give rise to stiff products which have low notched impact strengths.

EP 628 602 B2 describes polyamide blends consisting of a partly crystalline polyamide and a sufficient amount of amorphous polyamide, the mixing being performed in the melt in an extruder above 300° C. The intention is thereby to improve heat distortion resistance by adding amorphous polyamides with high $T_g$ in partly crystalline polyamides which have low glass transition temperatures ($T_g$).

The disadvantage of those polyamide blends according to EP 628 602 B2 consists in the tendency to separation and to increased haze under thermal stress. According to the screw structure of the extruder in the compounding, the quality of mixing of the materials differs, and this causes fluctuations in the properties. By virtue of an additional extrusion process after the polymerization process, the polymer blend is subjected twice to high temperatures, which impairs the quality (color, purity, transparency).

EP 1 847 569 A1 describes transparent, tough polyamide molding materials produced as a compound from amorphous transparent polyamides and elastomeric polyester amides. The amorphous transparent polyamides consist of cycloaliphatic monomers and long-chain aliphatic monomers. These amorphous transparent polyamides exhibit glass transition temperatures well above 100° C. and tensile moduli of elasticity of above 1500 MPa. These molding materials give rise to transparent, tough products which, however, have limited chemical resistance, i.e. toward alcohols, and limited flexibility. Furthermore, in the polyamide blends described here, there is, however, the risk of separation of the components and of reduction in quality in terms of transparency, color and purity.

Partly crystalline polyamides such as nylon-11 or nylon-12 possess excellent chemical resistance, excellent flexibility and good dynamic load-bearing capacity. However, these polyamides are not transparent and attain notched impact strengths in the low temperature range which do not exceed 10 kJ/m². In addition, significant changes in properties occur when the state changes from dry to conditioned.

WO 2008/006991 A2 describes polyamide blends which have $T_g$>75° C. and are based on 60-99% by weight of transparent, amorphous or crystalline polyamide (A) with $T_g$>90° C. and 40-1% by weight of polyether amide (B). This rules out amorphous and partly crystalline polyamides which have $T_g$<80° C. but may have, for example, excellent notched impact strength at low temperatures. It is also not obvious to work within a range with $T_g$ values of the polyamides of <80° C. in order to achieve transparent products, since the person skilled in the art knows that increasing crystallinity and hence haze is to be expected here, which deters him from such an operation.

DESCRIPTION OF THE INVENTION

It is therefore an object of the invention to provide polyamide molding materials based on transparent copolyamides, which can be used for production of transparent or colored moldings with moderate to high flexibility, high notched impact strength at low temperatures, excellent transparency, excellent chemical resistance and small changes in properties in the conditioned state. More particularly, it should be possible to base the material essentially on renewable raw materials.

This object is achieved in accordance with the invention by the molding materials as claimed in claim 1, comprising polyamide molding materials based on partly crystalline but simultaneously transparent copolyamides based predominantly on aliphatic monomers for production of transparent or colorable moldings with high flexibility, high notched impact strength (Charpy), low water absorption and excellent chemical resistance, i.e. high alcohol resistance, comprising 40 to 100% by weight of at least one partly crystalline, transparent copolyamide (A) with a glass transition temperature ($T_g$) of at most 80° C. and a melting temperature of at least 150° C., and an enthalpy of fusion of at least 20 J/g, preferably of at least 30 J/g, formed from at least two different diamines selected from the group consisting of linear and/or branched-chain aliphatic diamines having 9 to 14 carbon atoms and cycloaliphatic diamines, especially having 6 to 36 carbon atoms, where the concentration of cycloaliphatic diamine is 10 to at most 40 mol % and the concentration of aliphatic diamine at least 60 mol %, based in each case on the total diamine content, and from one or more aliphatic dicarboxylic acids, especially having 6 to 36 carbon atoms, 0 to 60% by weight of at least one further polymer (B) selected from the group consisting of amorphous or partly crystalline homo- or copolyamides, polyether ester amides, polyether amides, polyester amides or mixtures thereof, 0 to 10% by weight of customary additives (C) selected from the group consisting of UV stabilizers, heat stabilizers, free-radical scavengers and/or processing aids, inclusion inhibitors, lubricants, mold release aids, plasticizers, functional additives for influencing optical properties, especially refractive index, impact modifiers, nanoscale fillers and/or additives, optical brighteners, dyes or mixtures thereof, where the sum of components (A), (B) and (C) adds up to 100% by weight.

This object is also achieved by the process as claimed in claim 12, wherein the polymer components (A) and (B) are produced in known pressure vessels with a pressure phase at 230° C. to 300° C. with a subsequent decompression at 230° C. to 300° C., with a subsequent devolatilization at 240° C. to 300° C. and discharge of the polyamide molding materials in strand form, cooling, granulating and drying the pellets, compounding components (A), and optionally (B), and optionally (C) in the form of pellets, and shaping in an extruder at melt temperatures of 200° C. to 330° C. to give a strand, cutting with suitable granulators to give pellets, it being possible during the compounding to add additives desired for modification of the molding material, such as processing stabilizers, color pigments, UV absorbers, heat stabilizers, flame retardants and other transparent polyamides or nylon-12.

This object is finally achieved by the moldings as claimed in claims 13 to 17. The inventive moldings are obtainable from the aforementioned polyamide molding materials by means of injection molding processes and injection compression molding processes, extrusion processes, blow molding processes, especially extrusion blow molding processes, injection stretch blow molding processes, thermoforming processes and melt spinning processes at melt temperatures of 210° C. to 300° C., the mold being set to temperatures of 40° C. to 130° C., and the mold at temperatures of 40° C. to 130° C., after the cavity has been charged, optionally applying compression to the hot molding.

The dependent claims contain advantageous embodiments of the invention.

In a preferred embodiment, the inventive molding materials have a proportion of aliphatic structural units of at least 70% by weight, preferably of at least 75% by weight and more preferably of at least 80% by weight. This means the proportion by weight of the aliphatic structural units in component A or in components A and B, based on the total mass of component A or the sum of components A and B. The mass of the aliphatic structural unit corresponds to the mass of the aliphatic monomer used (e.g. 202.25 g/mol for sebacic acid or 172.32 g/mol for decanediamine) minus the mass of the cleavage products formed in the polycondensation (34 g/mol for diacids, 2 g/mol for diamines).

In a further preferred embodiment, the aliphatic structural units in components A and/or B derive predominantly or even exclusively from monomers based on renewable raw materials. Thus, the inventive molding materials have a biobased content to ASTM D6866-06 of at least 70% by weight, preferably of at least 75% by weight and especially of at least 80% by weight.

The inventive molding materials have a glass transition temperature of at most 80° C. and a melting temperature of at least 150° C. The transparency of a sheet produced from the transparent molding material and having a thickness of 2 mm, measured as the light transmittance to ASTM D1003, is more than 85%, especially at least 88%, more preferably 90%, and the haze is not more than 10%.

The invention thus relates to flexible polyamide molding materials based on transparent and partly crystalline copolyamides having a glass transition temperature ($T_g$) of at most 80° C., preferably of at most 70° C., more preferably of at most 65° C., and a melting temperature of at least 150° C., which are suitable for producing high-transparency or colored moldings.

Transparency is defined as usual via the measurement of light transmittance to ASTM standard D 1003. Thus, the copolyamides (A) used in accordance with the invention preferably have a $T_g$ in the range from 0 to 75° C. and more preferably in the range from 20 to 70° C. The melting points are preferably in the range from 150 to 250° C. and more preferably in the range from 150 to 200° C.

The heat of fusion (HF) or the enthalpy of fusion, determined to ISO 11357-1/2, of the inventive copolyamides (A) is at least 20 J/g, preferably at least 30 J/g.

The partly crystalline, transparent copolyamides (A) are notable for a very high Charpy notched impact strength (to ISO 179/KeV), especially at low temperatures below freezing point with a value significantly above 10 kJ/m$^2$ (at −30° C.)

Products produced from the inventive copolyamides are very resistant to alcohols and show little impairment of transparency (light transmittance and haze) after treatment with alcohols. Owing to the excellent alcohol resistance, haze is increased by storage in different alcohols (methanol, ethanol, isopropanol or spirits) by less than 5%, preferably by less than 3% and more preferably not at all. In the context of the present invention, the excellent chemical resistance achieved is therefore understood in the sense of excellent alcohol resistance (as a test parameter).

Products (for example housings, spectacles, tubes, fibers, films, etc.) produced from these inventive copolyamides exhibit high flexibility, comparable to that of nylon-12, the influence of conditioning being significantly lower in the inventive molding materials than in nylon-12.

The tensile modulus of elasticity of the moldings produced from the inventive copolyamides is not more than 1700 MPa, preferably not more than 1500 MPa and more preferably not more than 1300 MPa, and is virtually unchanged on water absorption (conditioning). The inventive moldings thus have moderate to high flexibilities in the range of 500-1700 MPa, preferably in the range of 500 to 1500 MPa, more preferably of 500-1300 MPa, similarly to the aliphatic polyamides formed from long-chain flexible monomers, especially, for example, nylon-11 or nylon-12.

These molding materials comprising inventive copolyamides (A) and optionally polymers (B) can be produced on customary polymerization systems and processed to moldings by thermal shaping. In addition to processing by injection molding, it is also possible to employ processes such as profile or film extrusion, injection stretch blow molding, injection blow molding, injection compression molding, insert molding or thermoforming (cf. claim 13).

Moldings produced from the partly crystalline, transparent copolyamides (A) with high-quality surfaces are used to promote "high end quality" positioning of automobile equipment, domestic appliances, consumer electronics, in the visible region.

Moldings produced from the partly crystalline, transparent copolyamides with high transparency and high flexibility also permit applications in the field of sports equipment, sports shoes, soles for sports shoes, transparent flexible shoe soles for professional running shoes, and other shoes of all kinds.

Moldings produced from the partly crystalline, transparent copolyamides with excellent toughness at low temperatures also preferably permit applications in the field of items of equipment, ski boots, ski bindings, safety equipment, protective goggles, helmets, protectors for winter sports, competitive cycling or competitive motorcycling.

Moldings produced from the partly crystalline, transparent copolyamides with high flexibility, toughness at low temperatures and excellent chemical resistance to cleaning chemicals are also suitable for installations, protective equipment, mounts or panels, especially for chill rooms or refrigerators.

Moldings produced from the partly crystalline, transparent copolyamides with excellent surfaces can be processed on known processing systems by known processes to give high-quality moldings which are used as sun lenses, optical lenses, housing or display material for cellphones, GPS units, MP3 players, spectacles, photographic lenses, camera housings, optical instruments, binoculars, etc. The molding material can be processed to give transparent tubes, pipes, wires, films and profiles.

Virtually the only monomers now available based on natural raw materials are aliphatic monomers. They have to be combined with cycloaliphatic, aromatic or branched monomer units in order to obtain transparent products. The biobased content of at least 70% required in accordance with the invention, however, requires large amounts of aliphatic moieties, which first lowers the glass transition temperature ($T_g$), the stiffness and the light transmittance (as a measure of the transparency), and secondly increases the haze. An example here is a composition of the PA10I/1010 type which has a biobased content of more than 50%. With a moderate or low concentration of the 10 I system (I=isophthalic acid), a $T_g$ of less than 80° C. is attained, the transparency exceeds 90%, but the haze at 20% is still outside the range tolerable for high-quality optical applications.

Compositions of the MACM10/1010 or MACM12/1012 type with a biobased content resulting from decanediamine and decanedioic acid of less than 70% are amorphous and exhibit acceptable heat distortion resistances with $T_g$s above 80° C. Transparency is very good, haze acceptable.

Surprisingly, the inventors of the present application found that the copolyamides MACM 6-36/6-36 6-36, preferably the copolyamides MACM 9-18/9-14 9-18, especially the copolyamides MACM 9-18/10-12 9-18 or MACM 9-18/10 9-18, have the desired properties addressed above. As expected, the crystallinity of these polyamide systems increases with increasing aliphatic monomer content. The expected increase in haze of these partly crystalline polyamides, however, surprisingly does not occur, even when the concentration of the aliphatic diamine is increased up to 90 mol % of the total diamine content. As expected, the glass transition temperature falls below 80° C. when the concentration of the cycloaliphatic diamine falls below 40 mol %. The heat distortion resistance, which correlates with the $T_g$ in the customary transparent polyamides, however, is raised again to an acceptable level by the increasing crystallinity (in this context, compare CE8 with E4, E5 and E6, and CE9 with E7 and E8 in the examples, below). For example, the copolyamides MACM10/1010 with an MACM10 content of 26 mol % have a glass transition temperature of 61° C. and the biobased content is 83%. At the same time, this copolyamide has a melting point of 172° C. and a high enthalpy of fusion of 43 J/g, meaning that the crystallinity is comparable to a nontransparent nylon-12. When the aliphatic monomer content is increased further, the $T_g$ decreases, but the melting point and the crystallinity increase further. Contrary to expectations, the haze measured on sheets of thickness 2 mm is below 5%, and the transmittance values at more than 93% are at a very high level. The gloss measured at an angle of 20° attains maximum values of approx. 150%. In high-transparency materials, the gloss values rise above 100% since the lower surface likewise reflects light, which is added on to the upper surface.

Copolyamides of the MACM12/1012, MACM14/1014 and MACM18/1018 type exhibit comparable behavior to the MACM10/1010 types. The glass transition temperatures ($T_g$) are lower with increasing length of the aliphatic monomers; the flexibility increases while the tensile modulus of elasticity decreases. Contrary to expectations, high transparency is maintained here too with increasing crystallinity. Contrary to expectations, the notched impact strength of these partly crystalline, transparent copolyamides, especially at low temperatures, increases with rising chain length of the aliphatic monomers, and significantly exceeds the level attainable for partly crystalline, nontransparent nylon-12.

The light transmittance value, which is used as a measure of the transparency, is always understood in the context of the present application to be that determined by the ASTM D1003 method (CIE-C illuminant). The measurement of light transmittance was carried out in the experiments detailed below on an instrument named Haze Guard Plus from BYK Gardner (Germany) on 70×2 mm disks or sheets of dimensions 60×60×2 mm. The transmittance value is reported for the visible wavelength range defined according to CIE-C, i.e. with significant intensities between approx. 400 and 770 nm. The 70×2 mm disks are produced for this purpose, for example, on an Arburg injection molding machine in a polished mold, with the barrel temperature between 200° C. and 340° C. and the mold temperature between 20° C. and 140° C.

The inventive transparent copolyamides thus have the light transmittance defined here and a partly crystalline morphology. The partly crystalline copolyamides are preferably polyamide systems which, processed in high molecular weight form without further constituents, give rise to transparent moldings, i.e. the dimension of the crystals in the molding is less than the wavelength of visible light (microcrystalline polyamides).

The moldings produced from the inventive unreinforced molding materials exhibit stiffnesses with tensile moduli of elasticity of not more than 1700 MPa, preferably with tensile moduli of elasticity of not more than 1500 MPa, more preferably of not more than 1300 MPa. The specimens for measurement of the Charpy impact values remained unfractured at room temperature (23° C.) and at −30° C.

The copolyamide component (A) is preferably based to an extent of more than 70% on renewable raw materials. This is achieved by using principally monomers, for example azelaic acid, sebacic acid, tetradecanedioic acid, C36 dimer fatty acid, aminoundecanoic acid, nonanediamine, decanediamine and tetradecanediamine, which are obtained from various vegetable oils.

A vegetable oil important for monomer production is castor oil, which is obtained from the seeds of the African wonder tree (Ricinus communis). Castor oil consists to an extent of 80 to 90% of the triglyceride of ricinoleic acid, and of further glycerides of different C18 fatty acids. Castor oil has already been used for thousands of years as a medicament, but it has also found use for a long time in industrial oils, cosmetics, coatings and hydraulic oils. Sebacic acid is obtained by alkaline cleavage of castor oil at high temperatures and subsequent treatment with hydrochloric acid. Pyrolytic decomposition of the methyl ester of ricinoleic acid gives heptaldehyde and methyl 10-undecenoate, and the latter is converted via a plurality of reaction stages to 11-aminoundecanoic acid.

Azelaic acid and brassylic acid are likewise based on natural raw materials; they are produced by ozonolysis of oleic acid and erucic acid respectively. Erucic acid is obtained from the seeds of rape, mustard, wallflower or cress.

The C36 dimer acids are prepared by thermal dimerization of unsaturated C18 carboxylic acids or esters thereof. Starting materials are, for example, tall oil fatty acids and oleic acid or linolenic acid.

Nonanediamine, decanediamine and tridecanediamine are likewise based on natural raw materials since they are prepared from the corresponding dicarboxylic acids, for example via the dinitrile route.

Further raw materials, for example obtained by microbiological fermentation, are becoming increasingly important in industry and can likewise be used.

The transparent copolyamide (A) is more preferably characterized in that it has a biobased content to ASTM D6866-06a of at least 70% by weight, preferably of at least 75% by weight and especially of at least 80% by weight.

In order that the inventive polyamide molding materials have the properties required above, it is necessary especially for the concentration of cycloaliphatic diamine in component (A) to be from 10 to at most 40 mol %, preferably at most 35 mol % and more preferably at most 30 mol %, based in each case on the total diamine content. Thus, cycloaliphatic diamines are used in a concentration range from 10 to 35 mol %, preferably in the range from 12 to 30 mol %, based on the total diamine content. According to the invention, the concentration of aliphatic diamine is always at least 60 mol %, especially at least 65 mol %.

In one embodiment of the invention, the diamine used may preferably be a mixture of 10 to 35 mol % of bis(4-amino-3-methylcyclohexyl)methane (MACM) and/or bis(4-aminocyclohexyl)methane (PACM) and 65 to 90 mol % of at least one linear or branched-chain aliphatic diamine having 9 to 14 carbon atoms, especially decanediamine, based in each case on the total amount of diamines. Preference is given in accordance with the invention to using the aliphatic diamines 1,9-nonanediamine, 1,10-decanediamine, 1,11-undecanediamine, 1,12-dodecane-diamine, 1,13-tridecanediamine or 1,14-tetradecane-diamine, particular preference being given to using 1,10-decanediamine as the aliphatic diamine.

According to the invention, however, the aliphatic diamines are generally always selected from the group consisting of 1,4-butanediamine, 2-methyl-1,5-pentanediamine, 1,6-hexanediamine, 1,7-heptanediamine, 1,8-octanediamine, methyl-1,8-octanediamine, 1,9-nonanediamine, 1,10-decanediamine, 1,11-undecane-diamine, 1,12-dodecanediamine, 1,13-tridecanediamine, 1,14-tetradecanediamine, 1,15-pentadecanediamine, 1,16-hexadecanediamine, 1,17-heptadecanediamine or 1,18-octadecanediamine. In the context of the present application, the term "aliphatic compounds" is always understood to mean a compound whose carbon atoms are arranged in straight or branched chains, in contrast to the cyclic compounds in which the carbon atoms form rings.

According to the invention the cycloaliphatic diamines are generally selected from the group consisting of bis(4-aminocyclohexyl)methane (PACM), 2,2-bis(4-amino-cyclohexyl)propane, bis(4-amino-3-methylcyclohexyl)-methane (MACM), 2,2-bis(4-amino-3-methylcyclohexyl)-propane, bis(4-amino-3-ethylcyclohexyl)methane (EACM), bis(4-amino-3,5-dimethylcyclohexyl)methane (TMACM), isophoronediamine (5-amino-1,3,3-trimethylcyclohexane-methanamine), 1,3-diaminocyclohexane, 1,3-diaminomethylcyclohexane, 2,5- or 2,6-bis(aminomethyl)-norbornane (DN), 2,5- or 2,6-diaminonorbornane.

Preference is given to using the cycloaliphatic diamine PACM and the alkyl-substituted bis(4-aminocyclo-hexyl) methane derivatives MACM, EACM and/or TMACM, especially MACM (cf. claim 4). If, in one embodiment of the invention, the cycloaliphatic diamine used is PACM, the diamine consists essentially of a mixture of 4,4-bis(aminocyclohexyl)methane isomers and contains only small proportions, if any, of 2,4 positional isomers; more particularly, the content of 2,4-bis(aminocyclohexyl)methane is less than 1% by weight.

The expression "PACM" used in this application represents the ISO name bis(4-aminocyclohexyl)methane, which is commercially available by the 4,4'-diaminocyclohexyl-methane trade name as the Dicykan product (CAS No. 1761-71-3). The expression "MACM" represents the ISO name bis(4-amino-3-methyl-cyclohexyl)methane, which is commercially available by the 3,3'-dimethyl-4,4'-diaminodicyclohexylmethane trade name as the Laromin C260 product (CAS No. 6864-37-5).

In the context of the present invention, the intention is that the expressions PACM and MACM include all trivial names, trade names or other names familiar to those skilled in the art, which correspond to the chemical structures of the above compounds.

The aliphatic diacid used is preferably an acid selected from the group consisting of azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, $C_{36}$ dimer fatty acid and mixtures thereof. Particular preference is given to sebacic acid, dodecanedioic acid, tetradecanedioic acid and octadecanedioic acid.

More particularly, the copolyamide (A) is characterized by chains with the following formula I:

$$(MACMX)_x/(10Y)_y/LC_z \qquad (I)$$

in which:
X, Y=aliphatic dicarboxylic acid(s) having 9 to 18 and 36 carbon atoms,
x=5-40 mol %,
y=30-90 mol %,
LC=lactam(s) and/or aminocarboxylic acid(s) having 6 to 12 carbon atoms,
z=0-50 mol %,
where x+y+z=100 mol % (i.e. the proportions of x, y and z in formula I are always 100%, such that the copolymer always contains more aliphatic than cycloaliphatic diamine units), and the sum of the proportions of X, 10Y and LC is at least 70% by weight. When X, Y and LC are based on renewable raw materials, the sum of the percentages by weight of X, 10Y and LC corresponds to the biobased content.

The repeat MACMX units used in formula (I) are amorphous units, for example of the MACM9, MACM10, MACM11, MACM12, MACM13, MACM14, MACM15, MACM16, MACM17, MACM18, MACM36 type, alone or in a mixture. The dicarboxylic acids having 9 to 18 or 36 carbon atoms are preferably prepared from mineral oil-independent, renewable raw materials. Some or all of the diamine MACM may be replaced by PACM or 2,6-norbornanediamine or 2,6-bis(aminomethyl)norbornane or 1,3-cyclohexyl-diamine or 1,3-bis(aminomethyl)cyclohexane, or isophoronediamine. Preferably, all or some MACM is replaced by PACM, or all or some is replaced by EACM or TMACM. More particularly, preference is given to MACM exclusively as the cycloaliphatic diamine.

The repeat 10Y units used in formula (I) are partly crystalline units, for example of the PA 109, PA 1010, PA 1011, PA 1012, PA 1013, PA 1014, PA 1015, PA 1016, PA 1017, PA 1018, PA 1036 type, alone or in a mixture, where the decanediamine may be replaced by undecanediamine or dodecanediamine. These components are preferably produced from a mineral oil-independent, renewable raw material.

Copolyamides (A) preferred in accordance with the invention are therefore MACM9/109, MACM10/1010, MACM11/1011, MACM12/1012, MACM13/1013, and MACM14/1014, MACM15/1015, MACM16/1016, MACM17/1017, MACM18/1018, MACM9/119, MACM10/1110, MACM11/1111, MACM12/1112, MACM13/1113 and MACM14/1114, MACM15/1115, MACM16/1116, MACM17/1117, MACM18/1118, MACM9/129, MACM10/1210, MACM11/1211, MACM12/1212, MACM13/1213, and MACM14/1214, MACM15/1215, MACM16/1216, MACM17/1217 and MACM18/1218.

Copolyamides (A) particularly preferred in accordance with the invention are MACM10/1010, MACM12/1012, MACM 14/1014 and MACM18/1018.

The repeat LC units used in formula (I) are preferably nylon-11 and nylon-12, and also α,ω-aminocarboxylic acids having 10 to 12 carbon atoms, or mixtures thereof. Preference is given to lactams from renewable raw materials and aminoundecanoic acid.

The component (B) used may be a further polymer which is preferably an amorphous or partly crystalline polyamide or copolyamide of the following formula (II):

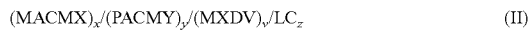
$$(MACMX)_x/(PACMY)_y/(MXDV)_v/LC_z \qquad (II)$$

in which:
X, Y, V=aliphatic dicarboxylic acid(s) having 9 to 18 and 36 carbon atoms and terephthalic acid (T) and isophthalic acid (I), and mixtures thereof,
x=0-100% by weight,
y=0-100% by weight,
v=0-100% by weight,
LC=lactam(s) and/or aminocarboxylic acid(s) having 6 to 12 carbon atoms,
z=0-100% by weight,
v+x+y+z=100% by weight.

Preferred representatives of this type of component (B) are, for example, the following polyamides or copolyamides: MACM9, MACM10, MACM11, MACM12, MACM13, MACM14, MACM15, MACM16, MACM17, MACM18, MACM36, MACMI/12, MACMI/MACMT/12, MACMI/PACMT/12, PA11, PA12, where I represents isophthalic acid and T terephthalic acid.

In addition, the further polymer (component (B)) may be selected from the group consisting of polyether ester amides, polyether amides, polyester amides or mixtures thereof. These copolymers may be of random, alternating or block structure. The polyamide component is based preferably on the polyamides PA6, PA66, PA69, PA610, PA612, PA99, PA1010, PA1011, PA1012, PA1013, PA1014, PA1015, PA1016, PA1017, PA1018, PA11, PA12 or mixtures thereof, where all or some of the decanediamine may be replaced by undecanediamine or dodecanediamine. Preference is given to the polyamide types PA1010, PA11 and PA12. The polyether components of these copolymers are based on the diols or diamines of the polyethylene glycols and/or polypropylene glycols and/or polytetramethylene glycols. The ester or polyester components are based on polyesters of aliphatic and/or aromatic dicarboxylic acids with aliphatic diols, preferably on dimer fatty acid diols.

The inventive polyamide molding materials contain preferably:
55 to 100% by weight of component (A),
0 to 45% by weight of component (B),
0 to 5% by weight of component (C),
and more preferably:
65 to 90% by weight of component (A),
10 to 35% by weight of component (B),
0 to 5% by weight of component (C).

The inventive polyamide molding materials may, however, comprise the customary additives (component C) in the typically small proportions (less than 10% by weight, preferably less than 5% by weight, especially preferably less than 3% by weight). The additives mentioned may be stabilizers such as UV stabilizers, heat stabilizers, free-radical scavengers and/or processing aids, inclusion inhibitors, lubricants, mold release aids, plasticizers and/or functional additives, preferably for influencing optical properties, such as especially the refractive index, or combinations or mixtures thereof. In addition, the molding materials may include (as component C) nanoscale fillers and/or functional substances, for example layer minerals or metal oxides which increase the refractive index, or optical brighteners or dyes, for example photochromic dyes.

In the context of the invention, the molding materials may also comprise fillers and/or additives familiar to those skilled in the art, for example glass fibers, glass beads, carbon fibers, carbon black, graphite, flame retardants, minerals, for example titanium dioxide, calcium carbonate or barium sulfate, or, for example, impact modifiers such as functionalized polyolefins.

Preferred impact modifiers originate from the group selected from acid-modified ethylene-α-olefin copolymers, ethylene-glycidylmethacrylic acid copolymers and methacrylate-butadiene-styrene copolymers.

It is also possible to add fillers or reinforcers to the inventive molding materials. In this case, the moldings produced from the molding materials are of course not transparent. In addition to glass and carbon fibers, the reinforcers used may particularly be those based on renewable raw materials and biobased contents more than 50%. Particular preference is given to using natural fibers, for example cellulose fibers, hemp fibers, flax fibers, cotton fibers, wool fibers or wood fibers.

Polymer components (A) and (B) are prepared in known pressure vessels. First, a pressure phase is run at 230° C. to 300° C. This is followed by decompression at 230° C. to 300° C. The devolatilization is performed at 240° C. to 300° C. Subsequently, the polyamide molding material is discharged in strand form, cooled in a water bath to 5° C. to 80° C., and pelletized. The pellets are dried at 80° C. to a water content below 0.06% for 12 h. During the drying with simultaneous circulation of the pellets, it is possible to apply, or apply by sintering, additives such as lubricants, dyes, stabilizers or others to the pellets.

To establish the desired relative viscosity (components (A), (B)), measured in 0.5% by weight m-cresol solution, of 1.45 to 2.30, preferably 1.55 to 2.00 and especially preferably of 1.60 to 1.90, it is possible to use either the diamine or the dicarboxylic acids in a slight excess of 0.01 to 2 mol %. Preference is given to performing the regulation with monoamine or monocarboxylic acids at 0.01 to 2.0% by weight, preferably 0.05 to 0.5% by weight. Suitable regulators are benzoic acid, acetic acid, propionic acid, stearylamine, or mixtures thereof. Particular preference is given to regulators having amine or carboxylic acid groups, which additionally contain stabilizer groups of the HALS type or of the tert-butylphenol type, for example triacetonediamine or isophthalic acid di(triacetonediamine) derivatives.

Suitable catalysts for accelerating the polycondensation reaction are phosphorus acids, for example $H_3PO_2$, $H_3PO_3$, $H_3PO_4$, salts thereof or organic derivatives thereof, which at the same time cause a reduction in discoloration during processing. The catalysts are added in the range from 0.01 to 0.5% by weight, preferably in the range from 0.03 to 0.1% by weight. Suitable defoamers for preventing foam formation during devolatilization are aqueous emulsions which comprise silicones or silicone derivatives in the range from 0.01 to 1.0% by weight, preferably in the range from 0.01 to 0.10 in a 10% emulsion.

Suitable heat or UV stabilizers can be added to the mixture actually before the polycondensation in amounts of 0.01 to 0.5% by weight. Preference is given to using high-melting types. Particular preference is given to using Irganox 1098.

The inventive transparent molding materials can be modified with additives, for example stabilizers, lubricants, for example paraffin oils or stearates, dyes, fillers, impact modifiers, for example ethylene-glycidyl methacrylate terpolymers, preferably with a refractive index in the region of the inventive molding materials, or maleic anhydride-grafted polyethylenes, propylenes, or reinforcers, for example transparently dispersible nanoparticles or glass beads or glass fibers, or mixtures of the additives, by subsequent known mixing processes, especially extrusion on single-shaft or multishaft extruders with melt temperatures between 250° C. and 350° C.

Suitable processes for producing high-transparency moldings from the inventive transparent polyamide molding materials are injection molding processes or injection compression molding processes at melt temperatures of 230° C. to 320° C., the mold being set to temperatures of 40° C. to 130° C., and the mold at temperatures of 40° C. to 130° C., after the cavity has been charged, optionally applying compression to the hot molding. Particularly suitable processes for producing fault-free, low-stress surfaces of the molding from the inventive transparent polyamide molding materials, for example lenses for spectacles or high-quality housing parts, is an expansion injection compression molding process, wherein cavities with wall thicknesses of 1 to 5 mm are filled and then the mold cavity is expanded with continued filling to higher wall thicknesses.

Suitable processes for producing films, tubes and semifinished products in single- or multilayer form from the inventive transparent polyamide molding materials are extrusion processes on single- or multishaft extruders with melt temperatures between 250° C. and 350° C., it being possible to use suitable adhesion promoters in the form of corresponding copolymers or blends according to the compatibility of the different layers.

Moldings formed from the inventive polyamide molding materials can be bonded to one another by customary methods, for example by ultrasound welding, incandescent wire welding, friction welding, spin welding or laser welding, by modification with laser-active dyes having absorption in the range of 800 nm to 2000 nm.

Suitable processes for producing hollow bodies and bottles in single- or multilayer form from the inventive transparent polyamide molding materials are injection blow molding processes, injection stretch blow molding processes and extrusion blow molding processes.

The inventive molding materials can also be processed to films, for example flat films, blown films, cast films or multilayer films. The films are processed further preferably by lamination, insert molding, stretching, orientation, printing or coloring.

Moldings can be colored in bulk or colored subsequently by means of dipping baths. Where appropriate, moldings are processed by milling, drilling, grinding, laser marking, laser cutting and/or laser welding.

Suitable uses for moldings formed from the inventive transparent polyamide molding materials are viewing windows for heating systems with direct oil contact, filter cups for drinking water treatment, baby bottles, bottles for carbonization, crockery, flowmeters for gases or liquid media, clock casings, watch casings, lamp housings and reflectors for automobile lamps.

The invention is now illustrated by the examples which follow, but without restricting it thereto.

EXAMPLES

The inventive polyamide molding material is produced in known laboratory pressure autoclaves of capacity 130 l. First, a pressure phase is run at 290° C. This is followed by decompression at 280° C. The devolatilization is likewise performed at 280° C. Subsequently, the polyamide molding material is discharged in strand form, cooled in a water bath and pelletized. The pellets are dried to a water content below 0.06% at 80° C. for 12 h. The production of high-transparency moldings or specimens from the inventive transparent polyamide molding materials was performed on an Arburg 420C Allrounder 1000-250 injection molding machine at melt temperatures of 250° C. to 280° C., with the mold set to the temperature of 60° C. The screw speed was 150 to 400 rpm.

The materials or moldings formed have the characteristic data listed in tables 1 and 2.

In tables 1 and 2:
CE=comparative example, E=inventive example;
n.f.=no fracture, n.m.=not measurable, n.d.=not determined.

The relative viscosity ($\eta_{rel}$) was determined to DIN EN ISO 307, in 0.5% by weight m-cresol solution at a temperature of 20° C.

The glass transition temperature ($T_g$), the melting point ($T_m$) and the heat of fusion (HF) were determined to ISO 11357-1/2. The differential scanning calorimetry (DSC) was performed with a heating rate of 20 K/min.

Tensile modulus of elasticity, breaking strength and elongation at break were determined to ISO 527 with a pulling speed of 1 mm/min (tensile modulus of elasticity) or 50 mm/min (breaking strength, elongation at break) on an ISO specimen, standard: ISO/CD 3167, A1 type, 170×20/10×4 mm at temperature 23° C. Charpy impact strength and notched impact strength were measured to ISO 179/keU on an ISO specimen, standard: ISO/CD 3167, B1 type, 80×10×4 mm at a temperature of −30° C., and 23° C.

Light transmittance (transparency) and haze were determined to ASTM D 1003 on sheets of dimensions 2×60×60 mm or on 2×70 mm disks at a temperature of 23° C. with the Haze Gard Plus instrument from Byk Gardner with CIE illuminant C. The light transmittance values are reported in % of the amount of incident light.

Haze after storage in alcohols:
Sheets of dimensions 2×60×60 mm were stored for a period of 60 minutes at 23° C. in methanol, isopropanol and ethanol of the purity level puriss. p.a., and in commercially available spirits. After drying the sheets at 23° C., the haze is determined to ASTM D 1003.

The gloss was measured to DIN EN ISO 2813 on a disk of dimensions 70×2 mm at a temperature of 23° C. with a Minolta Multi Gloss 268 at angles of 20° and 60°.

The melt volume rate (MVR), measured in cm/10 min, was determined to ISO 1133 at 275° C. with a load of 5 kg.

The moisture content was determined to method ISO 155/12.

The biobased content was calculated based on ASTM D6866-06a and corresponds to the percentage by weight of the structural units based on renewable raw materials in the polyamides in question.

The HDT B (0.45 MPa) was determined to ISO 75.

TABLE 1

| Example | | E1 | E2 | E3 | E4 | E5 | E6 | E7 | E8 |
|---|---|---|---|---|---|---|---|---|---|
| Polyamide/copolyamide to ISO 1874 | | MACM10/1010 (26:74) | MACM12/1012 (26:74) | MACM12/1012 (18:82) | MACM14/1014 (26:74) | MACM14/1014 (18:82) | MACM14/1014 (12:88) | MACM18/1018 (28:72) | MACM18/1018 (18:82) |
| Composition | | | | | | | | | |
| MACM | mol % | 13 | 13 | 9 | 13 | 9 | 6 | 14 | 9 |
| 1,10-Decanediamine | mol % | 37 | 37 | 41 | 37 | 41 | 44 | 36 | 41 |
| Sebacic acid | mol % | 50 | 0 | 0 | 0 | 0 | 0 | 0 | 0 |
| Dodecanedioic acid | mol % | 0 | 50 | 50 | 0 | 0 | 0 | 0 | 0 |
| Tetradecanedioic acid | mol % | 0 | 0 | 0 | 50 | 50 | 50 | 0 | 0 |
| Octadecanedioic acid | mol % | 0 | 0 | 0 | 0 | 0 | 0 | 50 | 50 |
| Laurolactam | mol % | 0 | 0 | 0 | 0 | 0 | | | |
| Biobased content (ASTM D6866-06a) | % | 82.7 | 84.0 | 88.8 | 85.1 | 89.5 | 93.0 | 85.9 | 90.8 |
| Properties | | | | | | | | | |
| Glass transition temperature | ° C. | 61 | 56 | 42 | 53 | 41 | 34 | 43 | 32 |
| Melting temperature | ° C. | 172 | 170 | 177 | 163 | 170 | 176 | 156 | 164 |
| Enthalpy of fusion | J/g | 43 | 35 | 42 | 34 | 43 | 47 | 41 | 48 |
| HDT B (conditioned) | ° C. | 58 | 85 | 88 | 81 | 83 | 84 | 74 | 79 |
| Relative viscosity | | 1.87 | 1.86 | 1.9 | 1.88 | 1.92 | 1.94 | 1.82 | 1.84 |
| MVR 275° C./5 kg | cm³/10 min | 52 | 55 | 43 | 79 | 53 | 45 | 54 | 53 |
| Water absorption 23° C./50% rel. humidity | % | 1.0 | 0.9 | 0.9 | 0.8 | 0.8 | 0.7 | 0.7 | 0.7 |
| Tensile modulus of elasticity dry | MPa | 1505 | 1345 | 1350 | 1225 | 1090 | 1060 | 940 | 670 |
| Tensile modulus of elasticity conditioned | MPa | 1685 | 1400 | 1325 | 1250 | 1195 | 1020 | 910 | 650 |
| Yield stress | MPa | 53 | 48 | 43 | 45 | 40 | 37 | 33 | 25 |
| Elongation at break | %* | 170 | 170 | 170 | 190 | 200 | 260 | 300 | 320 |
| Charpy impact strength 23° C. | kJ/m² | n.f. | n.f. | n.f. | n.f. | n.f. | n.f. | n.f. | n.f. |
| Charpy notched impact strength 23° C. | kJ/m² | 9.7 | 10.3 | 13.6 | 12.5 | 12.3 | 13.3 | 80% n.f. | n.f. |

TABLE 1-continued

| Example | | E1 | E2 | E3 | E4 | E5 | E6 | E7 | E8 |
|---|---|---|---|---|---|---|---|---|---|
| Charpy notched impact strength −30° C. | kJ/m² | 15.0 | 15.2 | 15.4 | 15.7 | 16.4 | 17.2 | n.f. | n.f. |
| Haze (2 mm) | % | 1.7 | 1.9 | 2.7 | 1.3 | 1.4 | 1.4 | 0.8 | 2.6 |
| Light transmittance (2 mm) | % | 93.6 | 93.8 | 93.2 | 93.8 | 93.4 | 93.7 | 93.8 | 93.3 |
| Gloss 20° | % | 151 | 152 | 127 | 150 | 145 | 150 | 145 | 112 |
| Haze (2 mm) after storage | | | | | | | | | |
| in methanol | % | 4.4 | 4.0 | 3.9 | 1.5 | 1.4 | 1.8 | 1.2 | 2.8 |
| in ethanol | % | 4.7 | 2.8 | 5.5 | 1.6 | 1.7 | 2.2 | 1.1 | 4.2 |
| in isopropanol | % | 2.8 | 3.3 | 3.1 | 1.4 | 1.3 | 1.5 | 1.2 | 3.7 |
| in spirits | % | 3.1 | 3.1 | 3.6 | 2.0 | 1.4 | 1.6 | 1.2 | 3.4 |

TABLE 2

| | | CE1 | CE2 | CE3 | CE4 | CE5 | CE6 | CE7 | CE8 | CE9 |
|---|---|---|---|---|---|---|---|---|---|---|
| Polyamide/copolyamide to ISO 1874 | | PA12 | MACM10 | MACM12 | MACM14 | MACM10/1010 (66:34) | MACM10/1010 (46:54) | MACM12/1012 (66:34) | MACM14/1014 (66:34) | MACM18/1018 (68:32) |
| Composition | | | | | | | | | | |
| MACM | mol % | | 50 | 50 | 50 | 33 | 23 | 33 | 33 | 34 |
| 1,10-Decanediamine | mol % | | 0 | 0 | 0 | 17 | 27 | 17 | 17 | 16 |
| Sebacic acid | mol % | | 50 | 0 | 0 | 50 | 50 | 0 | 0 | 0 |
| Dodecanedioic acid | mol % | | 0 | 50 | 0 | 0 | 0 | 50 | 0 | 0 |
| Tetradecanedioic acid | mol % | | 0 | 0 | 50 | 0 | 0 | 0 | 50 | 0 |
| Octadecanedioic acid | mol % | | 0 | 0 | 0 | 0 | 0 | 0 | 0 | 50 |
| Laurolactam | mol % | 100 | 0 | 0 | 0 | 0 | 0 | 0 | 0 | 0 |
| Biobased content (ASTM D6866-06a) | % | 0 | 41.6 | 45.4 | 48.7 | 59.2 | 70.5 | 62.0 | 64.4 | 67.6 |
| Properties | | | | | | | | | | |
| Glass transition temperature | ° C. | 25 | 164 | 153 | 145 | 116 | 89 | 110 | 103 | 90 |
| Melting temperature | ° C. | 178 | n.m. | n.m. | n.m. | n.m. | n.m. | n.m. | n.m. | n.m. |
| Enthalpy of fusion | J/g | 55 | n.m. | n.m. | n.m. | n.m. | n.m. | n.m. | n.m. | n.m. |
| HDT B (conditioned) | ° C. | 88 | 115 | 110 | n.d. | 90 | 58 | 90 | 83 | 68 |
| Relative viscosity | | 1.90 | 1.70 | 1.84 | 1.87 | 1.62 | 1.84 | 1.76 | 1.77 | 1.74 |
| MVR 275° C./5 kg | cm³/10 min | 20 | 22 | 22 | 44 | 93 | 46 | 50 | 59 | 61 |
| Water absorption 23° C./50% rel. humidity | % | 0.7 | 1.2 | 1.1 | 0.7 | 1.1 | 1.0 | 0.9 | 0.8 | 0.7 |
| Tensile modulus of elasticity dry | MPa | 1575 | 1740 | 1500 | 1400 | 1695 | 1635 | 1570 | 1425 | 1250 |
| Tensile modulus of elasticity conditioned | MPa | 1140 | 1750 | 1520 | 1440 | 1715 | 1620 | 1530 | 1375 | 1210 |
| Yield stress | MPa | 45 | 66 | 62 | 57 | 63 | 58 | 61 | 56 | 44 |
| Elongation at break | %* | 200 | 100 | 120 | 160 | 180 | 120 | 180 | 180 | 200 |
| Charpy impact strength 23° C. | kJ/m² | n.f. | n.f. | n.f. | n.f. | n.f. | n.f. | n.f. | n.f. | n.f. |
| Charpy notched impact strength 23° C. | kJ/m² | 10.0 | 11.3 | 11.6 | 11.0 | 6.8 | 8.9 | 6.7 | 6.3 | 6.5 |
| Charpy notched impact strength −30° C. | kJ/m² | 7.0 | 9.8 | 11.9 | 12.4 | 5.0 | 11.9 | 9.6 | 11.3 | 12.1 |

TABLE 2-continued

|  |  | CE1 | CE2 | CE3 | CE4 | CE5 | CE6 | CE7 | CE8 | CE9 |
|---|---|---|---|---|---|---|---|---|---|---|
| Haze (2 mm) | % | 100 | 1.4 | 0.4 | 0.9 | 2.3 | 1.0 | 7.2 | 6.4 | 1.6 |
| Light transmittance (2 mm) | % | 0 | 93.4 | 93.5 | 93.9 | 93 | 93.8 | 93.4 | 93.3 | 92.5 |
| Gloss 20° | % | 0 | 148 | 150 | 150 | 148 | 152 | 140 | 136 | 146 |
| Haze (2 mm) after storage | | | | | | | | | | |
| in methanol | % | n.d. | n.d. | 49 | 1.6 | 99.3 | 12 | 18 | 8.3 | 1.6 |
| in ethanol | % | n.d. | n.d. | 94 | 87 | 100 | 36 | 97 | 98 | 1.7 |
| in isopropanol | % | n.d. | n.d. | 5.5 | 10 | 101 | 19 | 100 | 96 | 2.3 |
| in spirits | % | n.d. | n.d. | 100 | 100 | 100 | 30 | 100 | 73 | 1.6 |

The invention claimed is:

1. A polyamide molding material for the production of transparent or colorable moldings with high flexibility, high notched impact strength (Charpy), low water absorption and excellent chemical resistance, comprising:

40 to 100% by weight of at least one partly crystalline, transparent copolyamide (A) with a glass transition temperature ($T_g$) of at most 80° C. and a melting temperature of at least 150° C., and a heat of fusion of at least 20 J/g, where the glass transition temperature ($T_g$), the melting temperature ($T_m$) and the heat of fusion (HF) are determined according to ISO 11357-1/2, under conditions where the differential scanning calorimetry (DSC) is performed with a heating rate of 20 K/min, wherein the copolyamide (A) includes no aromatic dicarboxylic acids, the copolyamide (A) consisting of:
two or more different diamines, wherein
one of the diamines is a linear aliphatic diamine selected from the group consisting of: 1,10-decanediamine, 1,11-undecanediamine, and 1,12-dodecanediamine, and one of the diamines is a cycloaliphatic diamine, selected from the group consisting of: bis(4-amino-3-methylcyclohexyl)methane (MACM), 2,2-bis(4-amino-3-methylcyclohexyl) propane, bis(4-amino-3-ethylcyclohexyl) methane (EACM), bis(4-amino-3,5-dimethylcyclohexyl)methane (TMACM), isophoronediamine (5-amino-1,3,3-trimethylcyclohexanemethanamine, 1,3-diaminocyclohexane, 1,3-diaminomethylocyclohexane, 2,5- or 2,6-bis-(aminomethyl) norbornane (DN), and 2,t- or 2,6-diaminonorbornane,
where the concentration of the cylcoaliphatic diamine is 10 to 40 mol % and the concentration of the linear aliphatic diamine is at least 60 mol %, based in each case on the total diamine content and
one or more aliphatic dicarboxylic acids, selected from the group consisting of sebacic acid, undecanedioic acid, dedecanedioic acid, tridecanedioic acid, tetradecanedioic acid, pentadecanedioic acid, hexadecanedioic acid, heptandecanedioic acid, and octadecanedioic acid;

0 to 60% by weight of at least one further polymer (B) selected from the group consisting of: amorphous homopolyamides, amorphous copolyamides, partly crystalline homopolyamides, partly crystalline copolyamides, polyether ester amides, polyether amides, and polyester amides; and 0 to 10% by weight of customary additives (C) selected from the group consisting of:
UV stabilizers, free-radical scavengers, lubricants, mold release aids, plasticizers, optical brighteners, dyes, color pigments, flame retardants, heat stabilizers, processing aids, additives that influence optical properties, impact modifiers, fillers and mixtures thereof, where the sum of components (A), (B) and (C) adds up to 100% by weight.

2. The polyamide molding material based on transparent copolyamides as claimed in claim 1, wherein the copolyamides are based predominantly on monomers based on renewable raw materials, the biobased content according to ASTM D6866-068a of copolyamide (A) and/or of the further component (B) being at least 70% by weight.

3. The polyamide molding material as claimed in claim 1, wherein the concentration of cycloaliphatic diamine in component (A) is 10 to at most 35 mol %, based on the total diamine content.

4. The polyamide molding material as claimed in claim 1, wherein the copolyamide (A) is selected from the group consisting of: MACM10/1010, MACM11/1011, MACM12/1012, MACM13/1013, MACM14/1014, MACM15/1015, MACM16/1016, MACM17/1017, MACM18/1018, MACM10/1110, MACM11/1111, MACM12/1112, MACM13/1113 and MACM14/1114, MACM15/1115, MACM16/1116, MACM17/1117, MACM18/1118, MACM10/1210, MACM11/1211, MACM12/1212, MACM13/1213, and MACM14/1214, MACM15/1215, MACM16/1216, MACM17/1217 and MACM18/1218, wherein in each case MACM stands for bis(4-amino-3-methylcyclohexyl)methane.

5. A process for producing the polyamide molding material as claimed in claim 1, comprising the steps of:
producing the polymer component (A) in a pressure vessel with a pressure phase at 230° C. to 300° C., subjecting it to decompression at 230° C. to 300° C., subjecting it to devolatilization at 240° C. to 300° C.;
placing and shaping component (A) in the form of pellets in an extruder at melt temperatures of 200° C. to 330° C. to give a strand; and
cutting the strand with suitable granulators to obtain pellets of the polyamide molding material.

6. A molding produced using the polyamide molding material as claimed in claim 1, the molding formed by a process selected from the group consisting of:
injection molding, injection compression molding, extrusion, blow molding, injection stretch blow molding, thermoforming and melt spinning, wherein the thermoforming process or the melting spinning process is conducted at melt temperatures of 210° C. to 300° C.

7. The molding as claimed in claim 6, having a light transmittance measured according to ASTM D1003 of a sheet having a thickness of 2 mm of at least 85%.

8. The molding as claimed in claim 6, having a haze measured according to ASTM D1003 of a sheet having a thickness of 2 mm of at most 10%.

9. The molding as claimed in claim 6, characterized by a notched impact strength (Charpy, ISO 179/KeV), above 10 kJ/m$^2$ at –30 C.

10. The molding as claimed in claim 6, having a tensile modulus of elasticity measured according to ISO 527 of not more than 1700 MPa, where the tensile modulus of elasticity is essentially unchanged on water absorption (conditioning).

11. The molding as claimed in claim 6, in the form of sports equipment, sports shoes, soles for sports shoes, transparent flexible shoe soles for professional running shoes and other shoes of any kind, ski boots, ski bindings, safety equipment, protective goggles, helmets, protectors for winter sports, protectors for competitive cycling or protectors for competitive motorcycling, protective equipment, mounts or panels for chill rooms or refrigerators, sun lenses, optical lenses, housing or display material for cellphones, GPS units, MP3 players, spectacles, photographic lenses, camera housings, optical instruments, binoculars, transparent tubes, pipes, wires, films and profiles.

12. The molding as claimed in claim 6, having a light transmittance measured according to ASTM D1003 of a sheet and having a thickness of 2 mm of at least 90%.

13. The molding as claimed in claim 6, having a haze measured according to ASTM D1003 of a sheet and having a thickness of 2 mm of at most 3%.

14. The molding as claimed in claim 6, having a tensile modulus of elasticity measured according to ISO 527 of not more than 1700 MPa, where the tensile modulus of elasticity is essentially unchanged on water absorption (conditioning).

15. The molding as claimed in claim 6, having a light transmittance measured according to ASTM D1003 of a sheet and having a thickness of 2 mm of at least 90%.

16. The molding as claimed in claim 6, having a tensile modulus of elasticity measured according to ISO 527 of not more than 1300 MPa, where the tensile modulus of elasticity is essentially unchanged on water absorption (conditioning).

17. The molding as claimed in claim 6, characterized by a notched impact strength (Charpy, ISO 179/KeV), above 14 kJ/m$^2$ at −30° C.

18. The polyamide molding material as claimed in claim 1, wherein the partly crystalline, transparent copolyamide (A) has a heat of fusion of at least 30 J/g.

19. The polyamide molding material based on transparent copolyamides as claimed in claim 1, wherein the copolyamides of polymer component (A) and/or polymer component (B) are based predominantly on monomers based on renewable raw materials, the biobased content measured according to ASTM D6866-068a of copolyamide (A) and/or of the further component (B) being at least at least 80% by weight.

20. The polyamide molding material as claimed in claim 1, wherein the concentration of cycloaliphatic diamine in component (A) is in the range from 12 to 30 mol %, based on the total diamine content.

21. The polyamide molding material as claimed in claim 1, wherein the diamines as the diamine starting components for the transparent copolyamide (A) are 10 to 35 mol %, of bis(4-amino-3-methylcyclohexyl)methane (MACM) and 65 to 90 mol % of 1,10-decanediamine, based in each case on the total amount of diamines, is used for the transparent copolyamide (A).

22. The polyamide molding material as claimed in claim 1, wherein the copolyamide (A) is selected from the group consisting of MACM10/1010, MACM12/1012, MACM14/1014 and MACM18/1018.

23. A process for producing the polyamide molding material as claimed in claim 1, comprising the steps of:
producing each of the polymer components (A) and (B) in a pressure vessel with a pressure phase at 230° C. to 300° C., subjecting each of the polymer components (A) and (B) to decompression at 230° C. to 300° C., and then subjecting each of the polymer components (A) and (B) to devolatilization at 240° C. to 300° C.;
compounding the polymer components (A) and (B), and optionally the customary additives (C) in the form of pellets, and shaping the polymer components in an extruder at melt temperatures of 200° C. to 330° C. to give a strand, cutting with suitable granulators to obtain pellets of the polyamide molding material; and
cooling, granulating and drying the pellets,
wherein the customary additives (C) are selected from processing aids, color pigments, UV stabilizers, heat stabilizers, and flame retardants.

24. A molding produced using the polyamide molding material as claimed in claim 1, the molding formed by a process selected from the group consisting of injection molding, injection compression molding, extrusion, blow molding, and injection stretch blow molding, wherein the process is carried out at melt temperatures of 210° C. to 300° C., and the mold is set to temperatures of 40° C. to 130° C.

* * * * *